(12) United States Patent
Prasad et al.

(10) Patent No.: US 7,437,045 B2
(45) Date of Patent: Oct. 14, 2008

(54) DISPERSION OPTIMIZED OPTICAL FIBER FOR WIDEBAND OPTICAL TRANSMISSION

(75) Inventors: Shashikant Prasad, Bokaro Steel (IN); Manol Nair, Kerala (IN)

(73) Assignee: Sterlite Technologies Limited, Maharashtra (IN)

( * ) Notice: Subject to any disclaimer, the term of this patent is extended or adjusted under 35 U.S.C. 154(b) by 0 days.

(21) Appl. No.: 11/635,834

(22) Filed: Dec. 8, 2006

(65) Prior Publication Data

US 2007/0065084 A1 Mar. 22, 2007

(51) Int. Cl.
*G02B 6/036* (2006.01)

(52) U.S. Cl. ................................... 385/127

(58) Field of Classification Search ............... None
See application file for complete search history.

(56) References Cited

U.S. PATENT DOCUMENTS

| | | | |
|---|---|---|---|
| 4,251,251 A | 2/1981 | Blankenship | |
| 4,685,945 A | 8/1987 | Freund | |
| 6,477,305 B1 | 11/2002 | Berkey et al. | |
| 6,535,675 B1 * | 3/2003 | Rousseau et al. | 385/123 |
| 6,546,756 B1 | 4/2003 | Fewkes et al. | |
| 6,819,850 B2 * | 11/2004 | Sillard et al. | 385/127 |
| 6,879,764 B2 | 4/2005 | Changdar et al. | |
| 2001/0019651 A1 * | 9/2001 | Kato | 385/123 |
| 2003/0180020 A1 * | 9/2003 | Beaumont et al. | 385/127 |
| 2004/0013381 A1 * | 1/2004 | Sillard et al. | 385/127 |
| 2004/0126074 A1 * | 7/2004 | Bickham et al. | 385/127 |
| 2004/0131323 A1 * | 7/2004 | De Montmorillon et al. | 385/127 |
| 2005/0058418 A1 * | 3/2005 | Prasad et al. | 385/127 |
| 2005/0063656 A1 * | 3/2005 | Jablonowski et al. | 385/127 |

* cited by examiner

*Primary Examiner*—Sung Pak
*Assistant Examiner*—Mike Stahl
(74) *Attorney, Agent, or Firm*—Lowe Hauptman Ham & Berner, LLP

(57) ABSTRACT

A dispersion optimized optical fiber for wideband optical transmission is disclosed. The fiber comprise centre core, inner cladding, ring core, outer cladding and outer glass region, characterized by inner cladding provided onto outer periphery of the centre core, ring core, ring core provided onto outer periphery of inner cladding, outer cladding provided onto outer periphery of ring core, and outer glass region surrounding outer cladding, wherein refractive indices of various regions of the fiber are related in a manner that centre core has higher refractive index than that of ring core, ring core has higher refractive index than that of outer glass region, outer cladding has equal to or lower refractive index than that of outer glass region, and inner cladding has lower refractive index than that of outer cladding region, that is the refractive index of various regions of the fiber is related by relationship $n_1 > n_3 > n_5 \geq n_4 > n_2$ or the relationship $Del_1 > Del_3 > Del_5 \geq Del_4 > Del_2$.

20 Claims, 8 Drawing Sheets

DISPERSION OPTIMIZED OPTICAL FIBER FOR WIDEBAND OPTICAL TRANSMISSION

TECHNICAL FIELD OF THE INVENTION

The present invention relates to dispersion optimized optical fiber for wideband transmission. Particularly, it relates to dispersion optimized optical fiber for wideband transmission having low dispersion, low dispersion slope, high effective area, reduced bending induced loss and low polarization mode dispersion [PMD]. More particularly it relates to dispersion optimized single mode optical fiber suitable for high speed wideband transmission in the wavelength region varying from about 1450 nm to about 1625 nm including wavelength region from about 1450 nm to about 1530 nm [S-band region], from about 1530 nm to about 1565 nm (C-band region) and from about 1565 nm to about 1625 nm (L-band region). Even more particularly it relates to dispersion optimized single mode fiber, which is suitable for transmission of higher bandwidth over longer distance with more uniform [low slope] chromatic dispersion over about 1450 nm to about 1625 nm windows and yet has non-zero dispersion [NZD] not only at about 1550 nm, but also at 1460 nm, and therefore, does not have non-linearity problem in S-band region, meaning thereby it is suitable for application in more than one channel of transmissions.

BACKGROUND ART OF THE INVENTION

Over the last decade, the optical fibers have been developed and installed as the backbone of interoffice networks for voice, video and data transmission. These are becoming important with growing and expanding telecommunication infrastructure. Their importance is further increasing because of their high bandwidth applicability. The higher bandwidth demand is further increasing exponentially with time because of rapid growth of information technology.

The capacity of light-wave communication systems has undergone enormous growth during the last decade. The growing bandwidth demand can be met by using a dense wavelength division multiplexing, hereinafter referred to as DWDM, approach with low dispersion fibers. The requirements of fiber have had to change to support these advances, especially the requirement for the amount and uniformity (slope) of chromatic dispersion across these wavelengths. The DWDM approach enhances the effective data rate of an optical fiber link by, increasing the number of wavelength channels within the wavelength band.

Conventionally, the multi-mode fibers at wavelength of about 850 nm were used, which were replaced by single mode fibers having zero dispersion wavelength near about 1310 nm in the wavelength region varying from about 1310 nm to about 1550 nm. The single mode or mono-mode optical fibers have greater bandwidth than that of the multimode fibers.

Therefore, the research has been directed towards the development of the single mode fibers, as these fibers were observed to have lower attenuation loss between the wavelength varying from about 1300 nm to about 1550 nm.

However, when single wavelength moved through 1550 nm window for lower attenuation loss, the single mode fibers were observed to have very high dispersion loss.

The major disadvantage of the single mode fibers with high dispersion loss at about 1550 nm was that it restricted higher bit rate transmission. This disadvantage of single mode fibers has been overcome by the improved single mode fibers, known as zero dispersion shifted optical fibers, which have zero dispersion [ZD] at a wavelength of about 1550 nm, that is even when the wavelength shifted to about 1550 nm.

The theoretical analysis reveals that a single mode fiber having low dispersion loss and low dispersion slope with higher effective area is most desirable for high capacity DWDM, as referred hereinabove, transmission. However, the dispersion shifted fibers used for long distance systems in the prior art have resulted in poor DWDM performance due to non-linear effects, for example, four wave-mixing, self phase modulation, cross phase modulation etc. caused by zero dispersion region within the DWDM window. The dispersion flattened fiber which specify the dispersion magnitude less than 2 ps/nm.km between 1.3 to 1.6 µm have zero dispersion region within the DWDM window. This result is strong four wave mixing, which prevents good DWDM performance.

Ideally the dispersion of an optical fiber should have a constant value over the entire wavelength-operating region. However, the dispersion of fibers varies with the wavelength as the refractive index varies with the wavelength. Their dispersion slope $S_0$ quantifies this variability. The smaller the slope, the lesser the dispersion varies with the wavelength. Another advantage of the low dispersion and low dispersion slope fiber is that its small dispersion allows its minimum dispersion to be increased to better suppress the Four Wave Mixing non-linearity, while still keeping the fiber minimum dispersion small enough for the signals to travel to longer distances with minimum need for dispersion and dispersion slope compensation.

The prior art of the chromatic dispersion fiber has been illustrated in FIG. 1. It is a result of material and the waveguide dispersion. In the theoretical treatments of intramodal dispersion it is assumed, for simplicity, that the material and the waveguide dispersion can be calculated separately and then added to give the total dispersion of the mode. In reality these two mechanisms are intrinsically related, since the dispersive properties of the refractive index, which gives rise to material dispersion, also affect the waveguide dispersion. Material dispersion occurs because the index refraction varies as a function of the optical wavelength. On the other way waveguide dispersion is a function of the refractive index profile shape.

The parameters, like relationship of refractive index, and values of refractive index and radius of each part of the fibre, like centre core, cladding(s), ring core(s) and outer core, and the relationship between radius of such parts of the fibre, and number of cores and claddings decide the characteristic properties of thus obtained fiber and the applications of thus obtained fiber.

Therefore, the fibers known in the art are distinguished by way of their characteristic properties, which in-turn are decided by various parameters as stated herein above, i.e. by relationship of refractive index and radius of each part of the fibre, like centre core, cladding(s), ring core(s) and outer core, and the ranges [or values] of refractive index and radius of such parts of the fibre, and number of cores and claddings.

The fibers as known in the prior art either have low non-linearity but high bend loss or have low bend loss but less effective area or may have, higher non-linearity and higher bend loss or may have non-uniform chromatic dispersion over the third and fourth window or high dispersion slope, that is the fibre will not have desired characteristic properties and will sacrifice one of the property for achieving another property.

The increasing complexity of the demands on the fiber makes the designer to think further to re-design the refractive index profile [relationship between refractive index of each part of the fiber]. This requires thinking to have more complex designs. However, the complex designs are very sensitive to the manufacturing processes. The optical and material physics limits the combination of the above-said parameters, i.e. the relationship of refractive index and radius of each part of the fibre, like centre core, cladding(s), ring core(s) and outer core, and the ranges [or values] of refractive index and radius of such parts of the fibre, and number of cores and claddings, which are required to be achieved for obtaining a fiber having desired properties for desired applications.

It has been observed that the end product is the compromise, wherein each parameter is required to be selected in such a manner so as to have best possible combination of the parameters, wherein one parameter is achieved without adversely affecting performance of the critical attributes and system requirements. Insensitive system modeling is then required with each parameter to understand its impact.

It has been observed that the dispersion and dispersion slope varies with the wavelength and refractive index varies with the wavelength.

Therefore, in view of variation of dispersion and dispersion slope with the wavelength and variation of refractive index with the wavelength constant efforts are being made to develop optical fibers which have desired dispersion and dispersion slope and yet have such a refractive index profile and the configuration which is easy to be achieved and accordingly it is easy to fabricate the desired fiber which is suitable in as wider range of the wavelength as possible, that is to develop dispersion optimized optical fibers for wideband optical transmission.

One such optical fiber has been developed and disclosed in U.S. Pat. No. 6,879,764. The dispersion shifted fiber disclosed in this US patent has low dispersion slope between 1530 to 1565 nm (C-band) and 1565 to 1625 nm (L-band) transmissions and has been found suitable for transmission of higher bandwidth over longer distance with more uniform chromatic dispersion over the third and fourth window and has also been found to have optimized mode field diameter to achieve low bending induced loss at 1550 nm and at the more critical 1600 nm wavelength. This fiber comprises a centre core, two claddings, a ring core and the outer glass region, wherein first cladding is provided onto the outer periphery of the centre core, second cladding is provided onto outer periphery of the first cladding and the ring core is provided onto outer periphery of the second cladding, and the outer glass region surrounds the ring core as shown in FIG. 2. The configuration of this fiber is such that the refractive indices of centre core and the ring core are higher than that of the outer glass region and refractive indices of the claddings are lower than that of the outer glass region and the refractive indices are so selected that dispersion and chromatic dispersion slope are low and the bend loss is also low, but only during C- and L-band transmissions meaning thereby it is not suitable for S-band application. The another limitation of this fiber is that it has non-zero dispersion only at 1550 nm and not at 1460 nm, and therefore, it does have non-linearity problem, and can be used for only one channel of transmission and not for more than one channel of transmissions in the S-band region.

The another such optical fiber has been developed and disclosed in U.S. patent application Ser. No. 10/763,403. In accordance with one embodiment of this US application, the dispersion shifted fiber disclosed in this US application has higher spot area and comprises a center core region, one cladding region, a ring core region and an outer glass region, wherein the cladding is provided onto the outer periphery of the center core, and the ring core is provided onto the outer periphery of the cladding, and the outer glass region surrounds the ring core region as shown in FIG. 3A. The configuration of this fiber is such that the center core and the ring core have refractive indices higher than the outer glass region and the single cladding region has lower refractive index than the outer glass region. In accordance with second embodiment of this US application, the dispersion shifted fiber comprises a center core region, cladding region, a ring core region and an outer glass region, wherein the cladding region is divided into two cladding regions —inner cladding region and outer cladding region with ring core region being disposed therebetween so as to have inner cladding region onto the outer periphery of the center core, and the ring core region onto the outer periphery of the inner cladding region, and the outer cladding region onto the outer periphery of the ring core region, and the outer glass region surrounding the outer cladding region as shown in FIG. 3B. The configuration of this fiber is such that the center core and the ring core have refractive indices higher than the outer glass region and the cladding region has lower refractive index than the outer glass region, but the refractive index of both the cladding regions—inner cladding region and outer cladding region is selected to be same. The refractive indices of core, cladding and ring core regions of the fibers disclosed in this US application are so selected that the fibers thus obtained have low dispersion slope, low dispersion loss and the higher effective area, but only during C- and L-band transmissions meaning thereby the fibers of this US application also are not suitable for S-band application. The another limitation of these fibers is also same as of above fiber of first prior art, that is, these have non-zero dispersion only at 1550 nm and not at 1460 nm, and therefore, these do have non-linearity problem, and can be used for only one channel of transmission and not for more than one channel of transmissions in the S-band region.

NEED OF THE INVENTION

Therefore, there is a need to develop a dispersion optimized optical fiber having desired characteristic properties, that is, having low dispersion, low dispersion slope, high effective area, reduced bending induced loss and low PMD meaning thereby achieves one characteristic property without sacrificing another characteristic property, and at the same time has non-zero dispersion not only at about 1550 nm, but also at about 1460 nm, meaning thereby does not has non-linearity problem, and hence, can be suitably used not only for one channel of transmission, but also for more than one channel of transmissions. Further, there is a need to develop a dispersion optimized optical fiber suitable for high speed wideband transmission in the wavelength region varying from about 1450 nm to about 1625 nm, that is including wavelength region not only from about 1530 nm to about 1565 nm (C-band region) and from about 1565 nm to about 1625 nm (L-band region), but also from about 1450 nm to about 1530 nm [S-band region].

OBJECTS OF THE INVENTION

The main object of the present invention is to make a complete disclosure of a dispersion optimized optical fiber which is suitable for high speed wideband transmission in the wavelength region varying from about 1450 nm to about 1625 nm, that is including wavelength region not only from about 1530 nm to about 1565 nm (C-band region) and from about 1565 nm to about 1625 nm (L-band region), but also from about 1450 nm to about 1530 nm [S-band region].

Another object of the present invention is to make a complete disclosure of a dispersion optimized optical fiber having non-zero dispersion not only at about 1550 nm, but also at about 1460 nm.

Still another object of the present invention is to make a complete disclosure of a dispersion optimized optical fiber having no non-linearity problem, and hence, is capable of use in one channel of transmission as well as in more than one channel of transmissions.

Yet another object of the present invention is to make a complete disclosure of a dispersion optimized optical fiber having desired characteristic properties, that is, having low dispersion, low dispersion slope, high effective area, reduced bending induced loss and low PMD, that is it achieves one characteristic property without sacrificing another characteristic property.

This is further object of the present invention to make a complete disclosure of a dispersion optimized optical fiber having low dispersion and low dispersion slope so that non-linear effects in DWDM are not only suppressed but the transmission above 10 Gbit/s is also enhanced for the wideband wavelength region.

This is still further object of the present invention to make a complete disclosure of a dispersion optimized optical fiber which is suitable for metropolitan, long haul and ultra haul network transmission systems.

This is yet further object of the present invention to make a complete disclosure of a dispersion optimized optical fiber which is suitable for transmission in entire wavelength region including S-band, C-band and L-band regions even with wavelength division multiplexing [WDM] systems, for example CWDM and DWDM.

Other objects of the present invention will be apparent from the following description when read in-conjunction with accompanying drawings which are not intended to limit scope of the present invention.

BRIEF DESCRIPTION OF THE INVENTION

The present invention relates to a fiber having all desired characteristic properties including low dispersion, low dispersion slope, high effective area, reduced bending induced loss and low PMD, wherein one characteristic property is not sacrificed for achieving another characteristic property, meaning thereby having not only one of the desired characteristic properties but also having other desired characteristic properties, and at the same time having non-zero dispersion not only at about 1550 nm, but also at about 1460 nm, meaning thereby having no non-linearity problem, and hence, being suitable not only for use in one channel of transmission, but also for use in more than one channel of transmissions, and also being suitable for high speed wideband transmission in the wavelength region varying from about 1450 nm to about 1625 nm, that is including wavelength region not only from about 1530 nm to about 1565 nm (C-band region) and from about 1565 nm to about 1625 nm (L-band region), but also from about 1450 nm to about 1530 nm [S-band region].

In accordance with the present invention a dispersion optimized optical fiber having desired characteristic properties, that is, having low dispersion, low dispersion slope, high effective area, reduced bending induced loss and low PMD meaning thereby having all desired characteristic properties without sacrificing another desired characteristic property, and at the same time having non-zero dispersion not only at about 1550 nm, but also at about 1460 nm, meaning thereby having no non-linearity problem, and hence, being suitable for use not only for one channel of transmission, but also for more than one channel of transmissions is disclosed comprising a centre core, two claddings, a ring core and the outer glass region, characterized in that first cladding referred to as inner cladding is provided onto the outer periphery of the centre core, and ring core is provided onto outer periphery of the inner cladding and the second cladding referred to as outer cladding is provided onto outer periphery of the ring core, and the outer glass region surrounds the outer cladding.

According to the present invention the refractive indices of various regions of the presently disclosed fiber are related in a manner that the centre core and the ring core have higher refractive indices than that of the outer glass region, and the inner cladding surrounding the center core and the outer cladding surrounding the ring core have lower refractive indices than that of the outer glass region, and the inner cladding surrounding the center core has lower refractive index than that of the outer cladding surrounding the ring core, which has been surprisingly observed to provide a fiber having low dispersion, low dispersion slope, high effective area, reduced bending induced loss and low PMD over the operating wavelength region not only including C-band and L-band transmissions, but also including the S-band transmissions.

It has been surprisingly observed that a fiber having presently disclosed configuration, that is, the first cladding referred to as inner cladding is provided onto the outer periphery of the centre core, and the ring core is provided onto the outer periphery of the inner cladding and the second cladding referred to as outer cladding is provided onto the outer periphery of the ring core, and the outer glass region surrounds the outer cladding and having a refractive index profile wherein the refractive index of centre core is greater than that of the ring core, the refractive index of the ring core is greater than that of the outer glass region, the refractive index of the outer glass region is equal to or greater than that of the outer cladding region and the refractive index of the outer cladding region is greater than that of the inner cladding region, that is, the refractive index of the defined regions of the fiber is related by following equation 1a:—

$$n_1 > n_3 > n_5 > n_4 > n_2 \qquad \text{Eqn. (1a)}$$

or by equation 1b:—

$$n_1 > n_3 > n_5 = n_4 > n_2 \qquad \text{Eqn. (1b)}$$

wherein the refractive index of the centre core, inner cladding, ring core, outer cladding and outer glass region is identified by symbols $n_1$, $n_2$, $n_3$, $n_4$ and $n_5$ respectively, has been found to have low dispersion, low dispersion slope, high effective area, reduced bending induced loss and low PMD meaning thereby the fiber has all desired characteristic properties without sacrificing another desired characteristic property, and at the same time the fiber has non-zero dispersion not only at about 1550 nm, but also at about 1460 nm, meaning thereby the fiber has no non-linearity problem, and hence, has been found to be suitable for use not only for one channel of transmission, but also for more than one channel of transmissions in the S-band region.

Accordingly, in accordance with one embodiment of the present invention, the dispersion optimized optical fiber for wideband transmission comprises the centre core, the inner cladding, the ring core, the outer cladding and the outer glass region, characterized in that the inner cladding is provided onto the outer periphery of the centre core, the ring core is provided onto the outer periphery of the inner cladding, the outer cladding is provided onto the outer periphery of the ring core, and the outer glass region surrounds the outer cladding, wherein the refractive indices of various regions of the presently disclosed fiber are related in a manner that the centre core has higher refractive index than that of the ring core, the ring core has higher refractive index than that of the outer glass region, the outer cladding has lower refractive index than that of the outer glass region, the inner cladding has lower refractive index than that of the outer cladding region, that is the refractive index of various regions of the fiber is related by the equation 1a:—

$$n_1 > n_3 > n_5 > n_4 > n_2 \quad \text{Eqn. (1a)}$$

wherein the refractive index of the centre core, inner cladding, ring core, outer cladding and outer glass region is identified by symbols $n_1$, $n_2$, $n_3$, $n_4$ and $n_5$ respectively.

Accordingly, in accordance with another embodiment of the present invention, the dispersion optimized optical fiber for wideband transmission comprises the centre core, the inner cladding, the ring core, the outer cladding and the outer glass region, characterized in that the inner cladding is provided onto the outer periphery of the centre core, the ring core is provided onto the outer periphery of the inner cladding, the outer cladding is provided onto the outer periphery of the ring core, and the outer glass region surrounds the outer cladding, wherein the refractive indices of various regions of the presently disclosed fiber are related in a manner that the centre core has higher refractive index than that of the ring core, the ring core has higher refractive index than that of the outer glass region, the outer cladding region has refractive index equal to the refractive index of the outer glass region, and the inner cladding has lower refractive index than that of the outer cladding region, that is the refractive index of various regions of the fiber is related by the equation 1b:—

$$n_1 > n_3 > n_5 = n_4 > n_2 \quad \text{Eqn. (1b)}.$$

wherein the refractive index of the centre core, inner cladding, ring core, outer cladding and outer glass region is identified by symbols $n_1$, $n_2$, $n_3$, $n_4$ and $n_5$ respectively.

In accordance with still another embodiment of the present invention, the dispersion optimized optical fiber for wideband transmission comprises the centre core, the inner cladding, the ring core, the outer cladding and the outer glass region, characterized in that the inner cladding is provided onto the outer periphery of the centre core, the ring core is provided onto the outer periphery of the inner cladding, the outer cladding is provided onto the outer periphery of the ring core, and the outer glass region surrounds the outer cladding, wherein one or more regions of the fiber have more than one segment having different refractive index. However, a care is taken that the overall configuration and the relationship of refractive index of each region of the fiber is defined by above-defined equation 1a, that is, the segments of centre core have higher refractive index than that of the segments of ring core, the segments of ring core have higher refractive index than that of the outer glass region, the segments of outer cladding have lower refractive index than that of the outer glass region, the segments of inner cladding have lower refractive index than that of the segments of outer cladding region meaning thereby the fiber is characterized by relationship of refractive index of each region of the fiber being defined by above-defined equation 1a.

In accordance with yet another embodiment of the present invention, the dispersion optimized optical fiber for wideband transmission comprises the centre core, the inner cladding, the ring core, the outer cladding and the outer glass region, characterized in that the inner cladding is provided onto the outer periphery of the centre core, the ring core is provided onto the outer periphery of the inner cladding, the outer cladding is provided onto the outer periphery of the ring core, and the outer glass region surrounds the outer cladding, wherein one or more regions of the fiber have more than one segment having different refractive index. However, a care is taken that the overall configuration and the relationship of refractive index of each region of the fiber is defined by above-defined equation 1b, that is, the segments of centre core have higher refractive index than that of the segments of ring core, the segments of ring core have higher refractive index than that of the outer glass region, the segments of outer cladding have refractive index equal to the refractive index of the outer glass region, the segments of inner cladding have lower refractive index than that of the segments of outer cladding region meaning thereby the fiber is characterized by relationship of refractive index of each region of the fiber being defined by above-defined equation 1b.

In accordance with further embodiment of the present invention, the dispersion optimized optical fiber for wideband transmission comprises the centre core, the inner cladding, the ring core, the outer cladding and the outer glass region, characterized in that the inner cladding is provided onto the outer periphery of the centre core, the ring core is provided onto the outer periphery of the inner cladding, the outer cladding is provided onto the outer periphery of the ring core, and the outer glass region surrounds the outer cladding, wherein the fiber comprises any one of the refractive index profile of above-defined one embodiment, another embodiment, still another embodiment or yet another embodiment, and wherein the outer glass region of such fiber is provided with one or more overclad layers to achieve desired diameter of the outer glass region wherein the refractive index of the overclad layers is equal to that of refractive index of outer glass region. However, a care is taken that the overall configuration and the relationship of refractive index of each region of the fiber remains same. For example, in case of above-defined still another and yet another embodiments, the segments of centre core have higher refractive index than that of the segments of ring core, the segments of ring core have higher refractive index than that of the outer glass region, the segments of outer cladding have equal to or lower refractive index than that of the outer glass region, the segments of inner cladding have lower refractive index than that of the segments of outer cladding region meaning thereby the fiber is characterized by refractive index of each region being related by above defined equation 1a or equation 1b.

The other objects, preferred embodiments and advantages of the present invention will be more apparent from the following description when it is read in conjunction with the accompanying figures which are incorporated for illustration of the preferred embodiments of the present invention and are not intended to limit scope of the present invention.

BRIEF DESCRIPTION OF THE ACCOMPANYING FIGURES

The nature of the present invention is described with the help of accompanying figures, which are incorporated with a view to demonstrate the invention and its best mode of operation. The present invention is however, limited by the configuration of the optical fiber and relationship of refractive indices of various regions of the optical fiber. The values of the refractive indices and radii of various regions of the fiber disclosed herein have also been found to result in the described surprising technical effects.

DETAILED DESCRIPTION OF THE INVENTION

Figure 1:
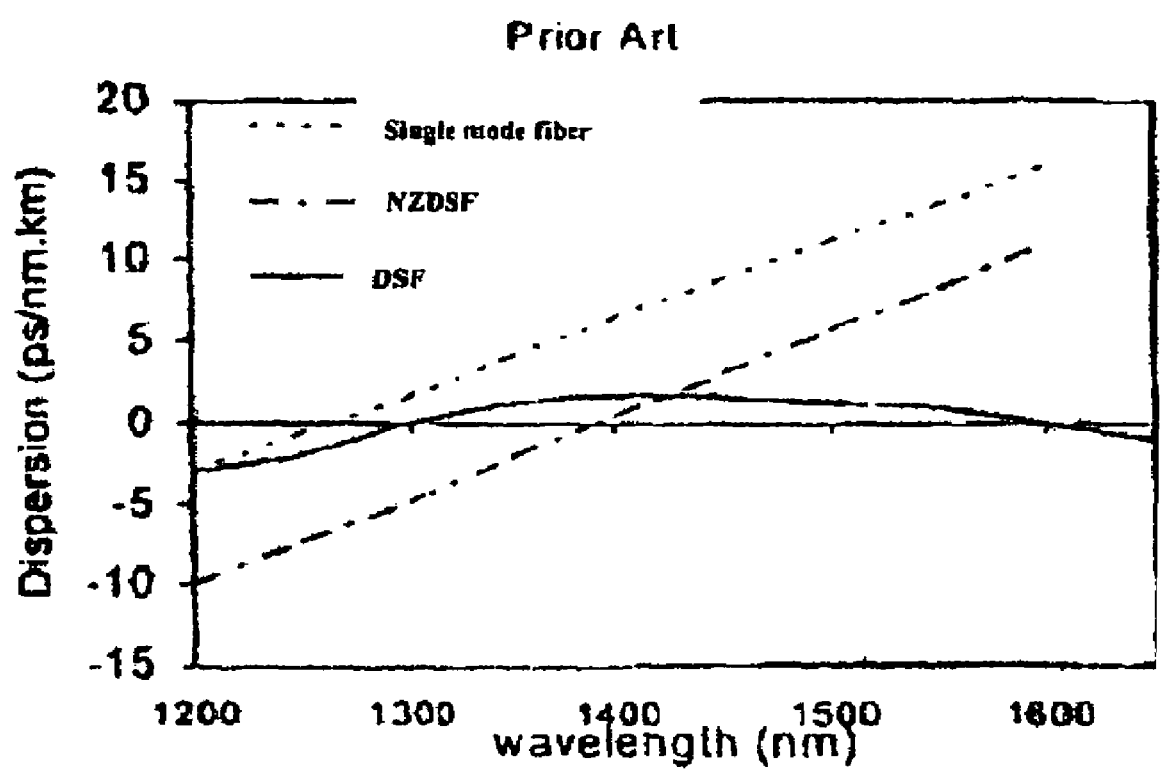
FIG. 1 shows the prior art of the chromatic dispersion of dispersion shifted fiber along with its material and waveguide components.
Figure 2:
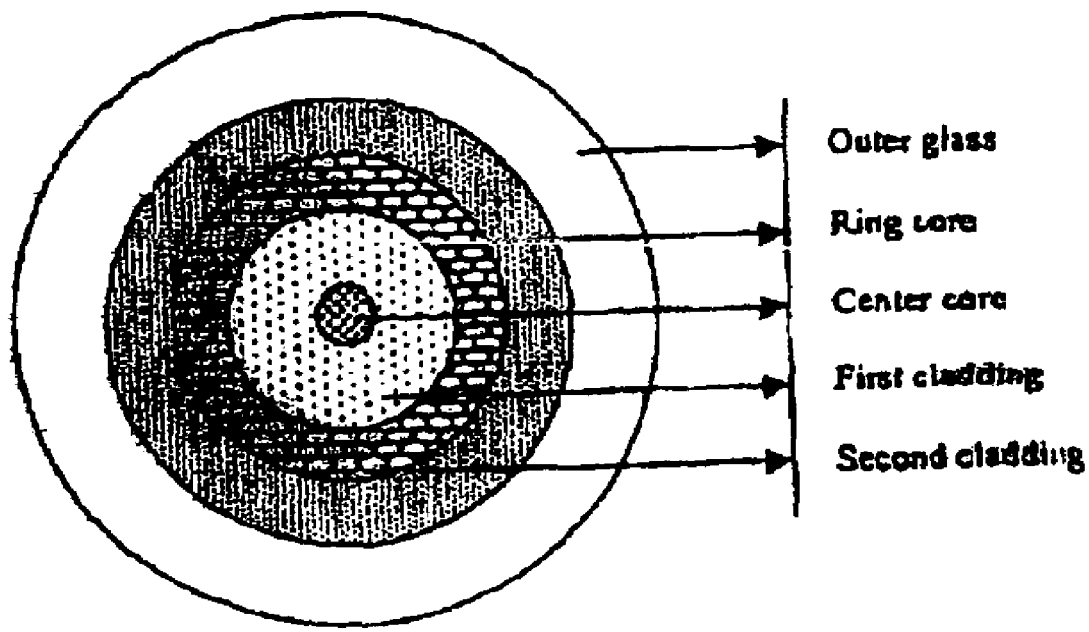
FIG. 2 shows a cut section of the optical fiber in accordance with first prior art.
Figure 3A:
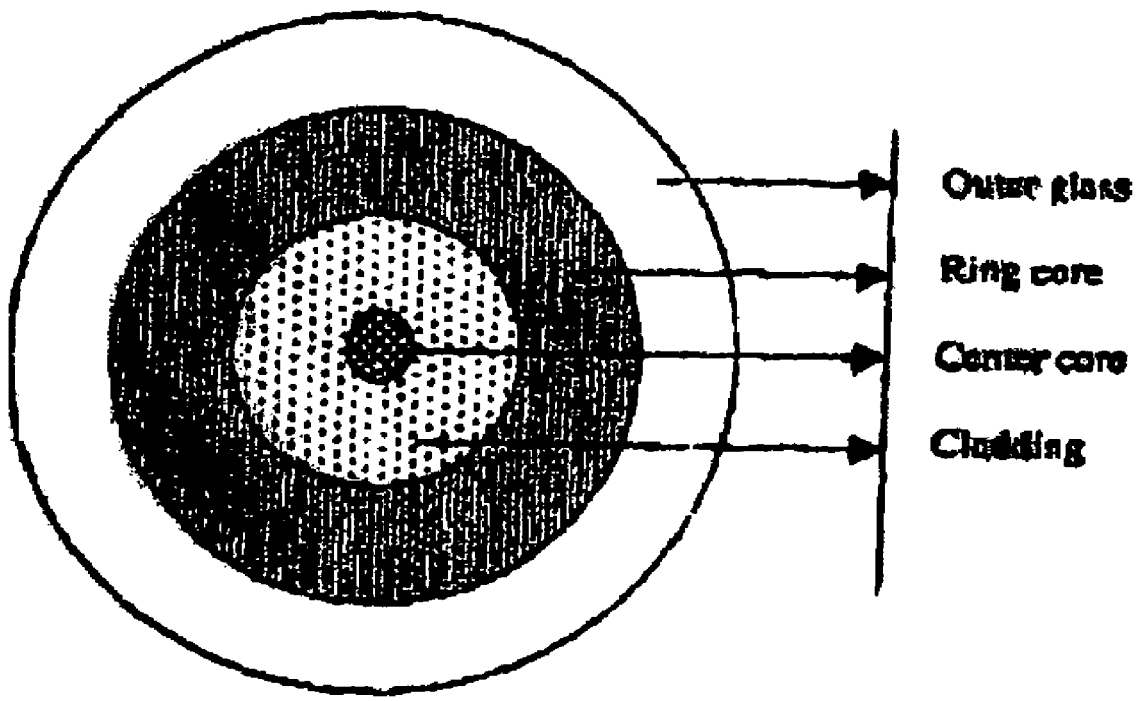
FIG. 3A shows a cut section of the optical fiber in accordance with first embodiment of second prior art.
Figure 3B:
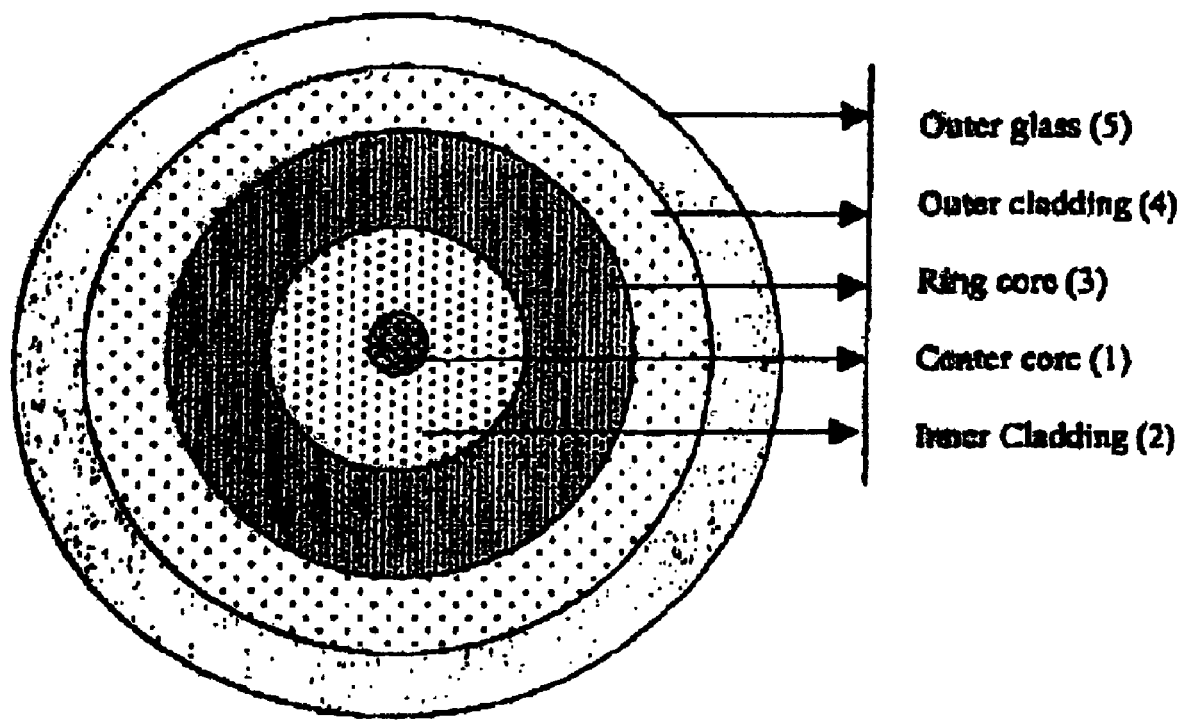
FIG. 3B shows a cut section of the optical fiber in accordance with second embodiment of second prior art.
Figure 4:
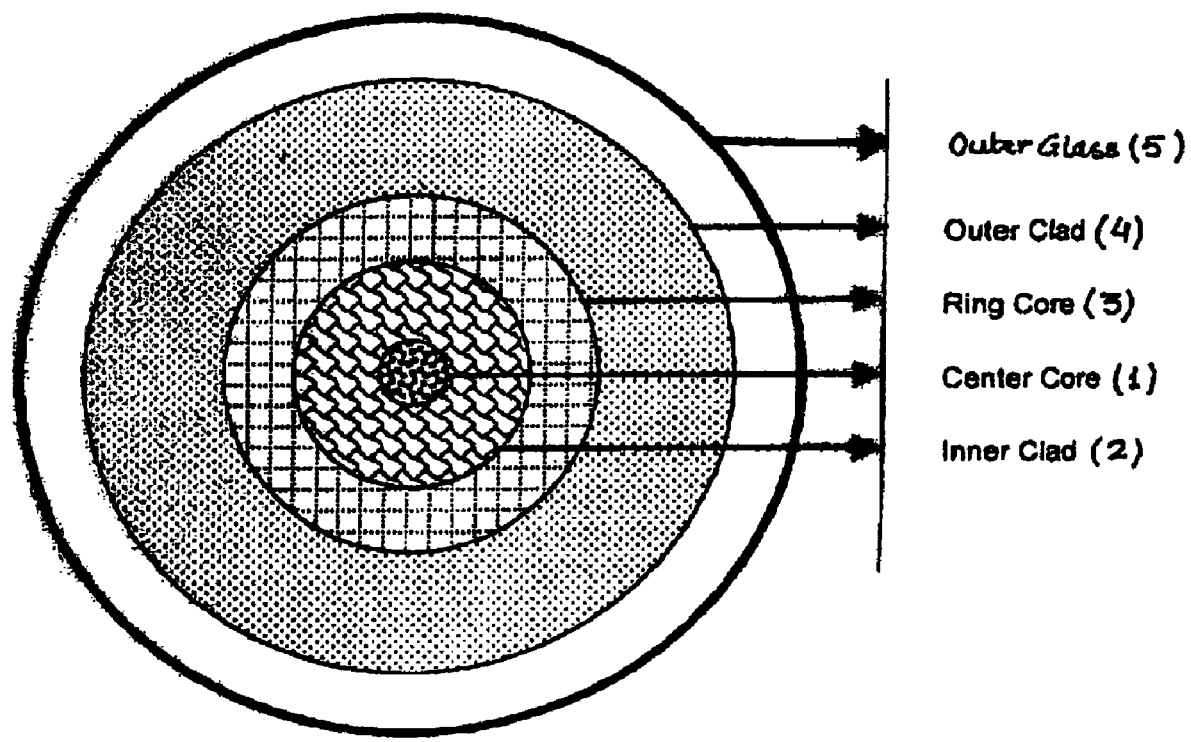
FIG. 4 shows a cut section of the optical fiber in accordance with one of the preferred embodiments of the present invention.

Now referring to accompanying FIG. 4, in accordance with the present invention a disclosed optical fiber, comprises a centre core 1, inner cladding 2, a ring core 3, outer cladding 4 and the outer glass region 5, characterized in that inner cladding 2 is provided onto the outer periphery of the centre core 1, and ring core 3 is provided onto outer periphery of the inner cladding 2 and the outer cladding 4 is provided onto outer periphery of the ring core 3, and the outer glass region 5 surrounds the outer cladding 4.

According to the present invention the refractive indices of various regions of the presently disclosed fiber are related in a manner that the centre core 1 and the ring core 3 have higher refractive indices than that of the outer glass region 5, and the inner cladding 2 surrounding the center core 1 and the outer cladding 4 surrounding the ring core 3 have lower refractive indices than that of the outer glass region 5.

In accordance with one embodiment of the present invention, the refractive indices of various regions of the presently disclosed fiber are related in a manner that the centre core 1 has higher refractive index than that of the ring core 3, the ring core 3 has higher refractive index than that of the outer glass region 5, the outer cladding 4 has equal to or lower refractive index than that of the outer glass region 5, the inner cladding 2 has lower refractive index than that of the outer cladding region 5.

The refractive index of the centre core 1, inner cladding 2, ring core 3, outer cladding 4 and outer glass region 5 are identified by symbols $n_1$, $n_2$, $n_3$, $n_4$ and $n_5$ respectively.

In accordance with the present invention, the refractive indices of various regions are characterized by a relationship defined in following equation 1a or 1b:—

$$n_1 > n_3 > n_5 > n_4 > n_2 \qquad \text{Eqn. (1a)}$$

or $$n_1 > n_3 > n_5 = n_4 > n_2 \qquad \text{Eqn. (1b)}$$

which has been surprisingly observed to provide a fiber having low dispersion, low dispersion slope, high effective area, reduced bending induced loss and low PMD meaning thereby the fiber disclosed in the present invention has been found to have all desired characteristic properties without sacrificing another desired characteristic property, and at the same time the fiber has been found to have non-zero dispersion not only at about 1550 nm, but also at about 1460 nm, meaning thereby the fiber has no non-linearity problem, and hence, has been found to be suitable for use not only for one channel of transmission, but also for more than one channel of transmissions in the S-band region.

The fiber of the present invention having presently disclosed configuration and refractive index profile as herein described, wherein the refractive index of each region is related in the manner described herein by equation 1a or 1b has been surprisingly observed to have chromatic dispersion more than about 2.0 ps/nm.km, varying from about 5.5 to about 10.0 ps/nm.km and varying from about 7.5 to about 14 ps/nm.km over the operating wavelength varying from about 1460 to 1530 nm [S-band], varying from about 1530 to about 1565 nm (C-band) and varying from about 1565 to about 1625 nm (L-band) respectively, an effective area more than about 50 $\mu m^2$, preferably varying from about 50 $\mu m^2$ to about 65 $\mu m^2$ and maximum dispersion slope less than about 0.07 ps/$nm^2$.km over the said wavelength regions.

In accordance with preferred embodiments of this invention, the refractive indices of various regions, i.e. the centre core region, the inner cladding region, the ring core region, the outer cladding region and the outer glass region and their respective values and the radii of each of said regions of the disclosed fiber are so selected that the fiber has low dispersion, low dispersion slope, high effective area, reduced bending induced loss and low PMD over the operating wavelength region not only including C-band and L-band transmissions, but also including the S-band transmissions, wherein the chromatic dispersion, the effective area and the dispersion slope characteristics are in or closer to above described ranges or values over the operating wavelength region not only including C-band and L-band transmissions, but also including the S-band transmission.

It has been surprisingly observed that the presently disclosed combination of configuration of the fiber having a center core 1 surrounded by inner clad 2 which is surrounded by ring core 3 which in-turn is surrounded by outer clad 4 provided with outer glass region 5 as illustrated with the help of accompanying FIG. 4, and relationship of refractive indices of each region of the fiber as illustrated with the help of above equation 1a or 1b in accordance with present invention, has resulted in the dispersion optimized optical fiber having desired characteristic properties, i.e., having chromatic dispersion more than about 2.0 ps/nm.km, varying from about 5.5 to about 10.0 ps/nm.km and varying from about 7.5 to about 14 ps/nm.km over the operating wavelength varying from about 1460 to 1530 nm [S-band], varying from about 1530 to about 1565 nm (C-band) and varying from about 1565 to about 1625 nm (L-band) respectively, an effective area more than about 50 $\mu m^2$, preferably varying from about 50 $\mu m^2$ to about 65 $\mu m^2$ and maximum dispersion slope less than about 0.07 ps/$nm^2$.km over the said wavelength regions and being suitable for application not only in C- and L-band transmissions, but also in S-band transmission.

Further, the dispersion optimized optical fiber of the present invention has also been observed to have not only low attenuation at 1550 nm <0.22 dB/Km and at 1625 nm <0.24 dB/Km, but also excellent bend resistance performance, i.e., bend induced loss <0.05 dB at 1550 nm and <0.1 dB at 1625 nm.

In accordance with first preferred embodiment of the present invention, the refractive indices of various regions of the presently disclosed dispersion optimized optical fiber for wideband transmission having presently disclosed configuration as illustrated in accompanying FIG. 4, that is comprising the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, are related in a manner that the centre core 1 has higher refractive index than that of the ring core 3, the ring core 3 has higher refractive index than that of the outer glass region 5, the outer cladding 4 has lower refractive index than that of the outer glass region 5, the inner cladding 2 has lower refractive index than that of the outer cladding region 4, that is the refractive index of various regions of the fiber is related by the equation 1a:—

$$n_1 > n_3 > n_5 > n_4 > n_2 \qquad \text{Eqn. (1a).}$$

The refractive index $n_1$, $n_2$, $n_3$, $n_4$ and $n_5$ may also be referred to as relative refractive index, that is relative refractive index of the centre core 1, inner cladding 2, ring core 3, outer cladding 4 and outer glass region 5 is identified by symbols $Del_1$, $Del_2$, $Del_3$, $Del_4$ and $Del_5$ respectively. Therefore, in accordance with this embodiment of the present invention, the relative refractive index of the presently disclosed fiber is characterized by equation 1a1:—

$$Del_1 > Del_3 > Del_5 > Del_4 > Del_2 \qquad \text{Eqn. (1a1).}$$

The relative refractive index of the various regions is calculated from refractive index of that region $[n_1, n_2, n_3, n_4]$ and refractive of the outer glass region $[n_5]$ by applying the following equation (1c).

$$Del_x = (n_x^2 - n_5^2)/(2 \times n_x^2 \times 100) \qquad \text{Eqn (1c)}$$

wherein x is 1, 2, 3, and 4 for centre core 1, inner cladding 2, ring core 3 and outer cladding 4 respectively.

Figure 5:
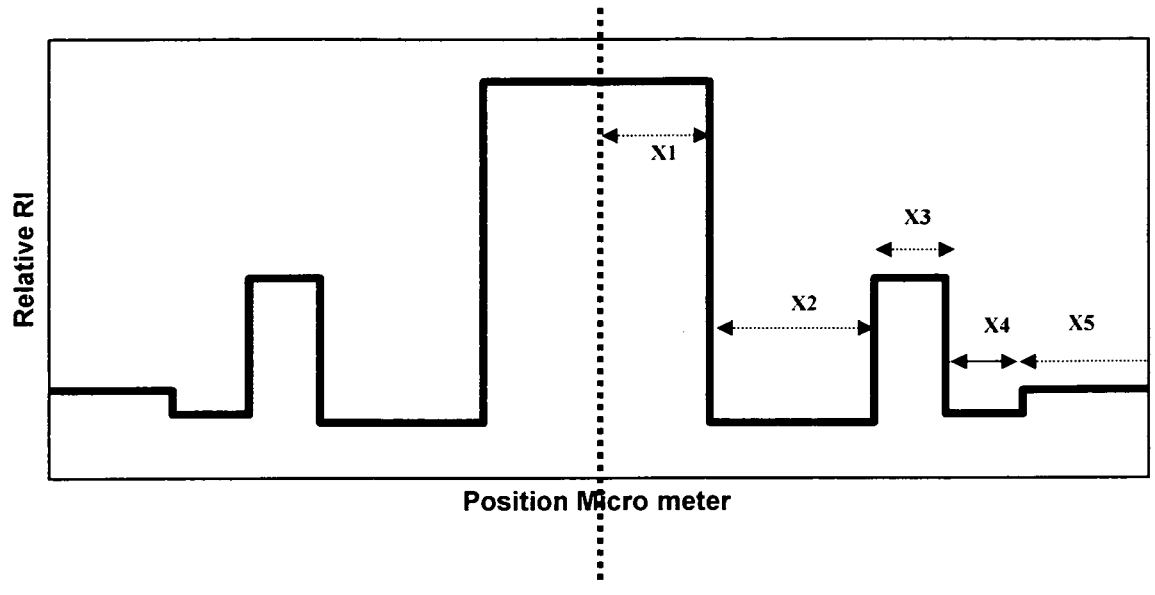
FIG. 5 shows refractive index profile of the optical fiber in accordance with first preferred embodiment of the present invention.

The fiber of first preferred embodiment of the present invention has refractive index profile along the radial axis of the fiber as illustrated in accompanying FIG. 5, wherein the outer cladding is depressed, which has also been surprisingly observed to result in reduction in bend induced loss and attenuation loss of the disclosed fiber.

In accordance with first preferred embodiment of the present invention, the relative refractive indices of various regions of the fiber measured by PK 2600 refractive index profiler are selected within the range as specified in Table 1.1.

TABLE 1.1

| Relative refractive index | Symbol | Nominal | Min | Max |
|---|---|---|---|---|
| Centre Core | $Del_1$ | 0.515372 | 0.481262 | 0.549446 |
| Inner clad | $Del_2$ | −0.03811 | −0.02425 | −0.05198 |
| Ring core | $Del_3$ | 0.172682 | 0.1589 | 0.186457 |
| Outer clad | $Del_4$ | −0.03464 | −0.02425 | −0.04504 |
| Outer glass | $Del_5$ | 0 | 0 | 0 |

In accordance with first preferred embodiment of the present invention, the thickness of the center core 1, inner cladding 2 ring core 3, outer clad 4 and outer glass 5 identified as X1, X2, X3, X4 and X5 respectively of the fiber as illustrated in the accompanying FIG. 5 are selected within the range as defined in the Table 1.2.

TABLE 1.2

| | | Width | | | |
|---|---|---|---|---|---|
| Thickness | Symbol | Nominal | Min | Max | Unit |
| Centre Core | X1 | 2.625 | 2.00 | 3.25 | μm |
| Inner clad | X2 | 4.050 | 3.30 | 4.80 | μm |
| Ring Core | X3 | 2.330 | 1.71 | 2.95 | μm |
| Outer clad | X4 | 1.900 | 1.30 | 2.50 | μm |
| Outer glass | X5 | 51.995 | 48.65 | 54.54 | μm |

In accordance with another embodiment of the present invention, the dispersion optimized optical fiber for wideband transmission comprises the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, wherein one or more said regions of the fiber have more than one segments having different refractive index. However, a care is taken that the overall configuration and the relationship of refractive index of each of said region of the fiber is defined by above-defined equation 1a, that is, the segments of centre core 1 have higher refractive index than that of the segments of ring core 3, the segments of ring core 3 have higher refractive index than that of the outer glass region 5, the segments of outer cladding 4 have lower refractive index than that of the outer glass region 5, the segments of inner cladding 2 have lower refractive index than that of the segments of outer cladding region 4 meaning thereby the fiber is characterized by relationship of refractive index of each region of the fiber being defined by equation 1a:—

$$n_1 > n_3 > n_5 > n_4 > n_2 \qquad \text{Eqn. (1a)}$$

or by equation 1a1

$$Del_1 > Del_3 > Del_5 > Del_4 > Del_2 \qquad \text{Eqn. (1a1).}$$

In accordance with still another embodiment of the present invention, the dispersion optimized optical fiber for wideband transmission comprises the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, wherein one or more said regions of the fiber have more than one segments having different refractive index. However, a care is taken that the overall configuration and the relationship of refractive index of each of said region of the fiber is defined by above-defined equation 1b, that is, the segments of centre core 1 have higher refractive index than that of the segments of ring core 3, the segments of ring core 3 have higher refractive index than that of the outer glass region 5, the segments of outer cladding 4 have refractive index equal to that of the outer glass region 5, the segments of inner cladding 2 have lower refractive index than that of the segments of outer cladding region 4 meaning thereby the fiber is characterized by relationship of refractive index of each region of the fiber being defined by equation 1b:—

$$n_1 > n_3 > n_5 = n_4 > n_2 \qquad \text{Eqn. (1b).}$$

or by equation 1b1

$$Del_1 > Del_3 > Del_5 = Del_4 > Del_2 \qquad \text{Eqn. (1b1).}$$

Therefore, in accordance with second preferred embodiment of the present invention, the refractive indices of various regions of the presently disclosed dispersion optimized optical fiber for wideband transmission having presently disclosed configuration as illustrated in accompanying FIG. 4, that is comprising the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, are related in a manner that the centre core 1 has higher refractive index than that of the ring core 3, the ring core 3 has higher refractive index than that of the outer glass region 5, the outer cladding 4 has lower refractive index than that of the outer glass region 5, the inner cladding 2 has lower refractive index than that of the outer cladding region 4, that is the refractive index of various regions of the fiber is characterized by the equation 1a:—

$$n_1 > n_3 > n_5 > n_4 > n_2 \qquad \text{Eqn. (1a).}$$

or by equation 1a1:—

$$Del_1 > Del_3 > Del_5 > Del_4 > Del_2 \qquad \text{Eqn. (1a1)}$$

wherein outer cladding region 4 is divided into two segments which may be identified as 4.1 and 4.2 having refractive index $n_{4.1}$ and $n_{4.2}$ respectively, or the relative refractive index $Del_{4.1}$ and $Del_{4.2}$ respectively and the thickness $X_{4.1}$ and $X_{4.2}$ respectively.

Figure 6:
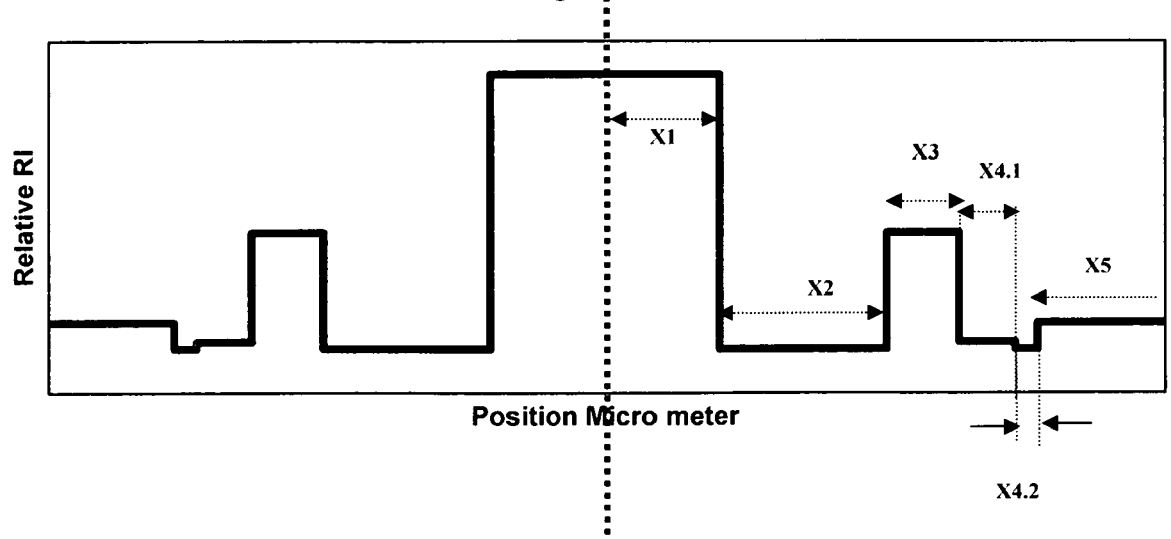
FIG. 6 shows refractive index profile of the optical fiber in accordance with second preferred embodiment of the present invention.

The fiber of second preferred embodiment of the present invention has refractive index profile along the radial axis of the fiber as illustrated in accompanying FIG. 6, wherein the outer cladding is divided into two segments and is depressed, which has been surprisingly observed to result in reduction in bend induced loss and attenuation loss of the disclosed fiber.

In accordance with second preferred embodiment of the present invention, the relative refractive indices of various regions of the fiber measured by PK 2600 refractive index profiler are selected within the range as specified in Table 2.1

TABLE 2.1

| Relative refractive index | Symbol | Nominal | Min | Max |
|---|---|---|---|---|
| Centre Core | $Del_1$ | 0.515372 | 0.481262 | 0.549446 |
| Inner clad | $Del_2$ | −0.03811 | −0.02425 | −0.05198 |
| Ring core | $Del_3$ | 0.172682 | 0.1589 | 0.186457 |
| Outer clad (4.1) | $Del_{4.1}$ | −0.03464 | −0.02425 | −0.04504 |
| Outer clad (4.2) | $Del_{4.2}$ | −0.05198 | −0.03811 | −0.06585 |
| Outer glass | $Del_5$ | 0 | 0 | 0 |

In accordance with second preferred embodiment of the present invention, the thickness of the center core 1, inner cladding 2, ring core 3, outer clad 4 and outer glass 5 identified as X1, X2, X3, X4 and X5 respectively of the fiber as illustrated in the accompanying FIG. 6 are selected within the range as defined in the Table 2.2.

TABLE 2.2

| | | Width | | | |
|---|---|---|---|---|---|
| Thickness | Symbol | Nominal | Min | Max | Unit |
| Centre Core | X1 | 2.625 | 2.00 | 3.25 | μm |
| Inner clad | X2 | 4.050 | 3.30 | 4.80 | μm |
| Ring Core | X3 | 2.330 | 1.71 | 2.95 | μm |

TABLE 2.2-continued

| | | Width | | | |
|---|---|---|---|---|---|
| Thickness | Symbol | Nominal | Min | Max | Unit |
| Outer clad (4.1) | X4.1 | 1.900 | 1.30 | 2.50 | μm |
| Outer clad (4.2) | X4.2 | 0.600 | 0.00 | 1.20 | μm |
| Outer glass | X5 | 51.995 | 48.65 | 54.54 | μm |

In accordance with third preferred embodiment of the present invention, the refractive indices of various regions of the presently disclosed dispersion optimized optical fiber for wideband transmission having presently disclosed configuration as illustrated in accompanying FIG. 4, that is comprising the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, are related in a manner that the centre core 1 has higher refractive index than that of the ring core 3, the ring core 3 has higher refractive index than that of the outer glass region 5, the outer cladding 4 has lower refractive index than that of the outer glass region 5, the inner cladding 2 has lower refractive index than that of the outer cladding region 4, that is the refractive index of various regions of the fiber is characterized by the equation 1a:—

$$n_1 > n_3 > n_5 > n_4 > n_2 \qquad \text{Eqn.(1a).}$$

or by equation 1a1:—

$$Del_1 > Del_3 > Del_5 > Del_4 > Del_2 \qquad \text{Eqn.(1a1)}$$

wherein each of inner cladding and outer cladding region are divided into two segments wherein the segments of inner cladding region may be identified as 2.1 and 2.2 having refractive index $n_{2.1}$ and $n_{2.2}$ respectively, or the relative refractive index $Del_{2.1}$ and $Del_{2.2}$ respectively and the thickness $X_{2.1}$ and $X_{2.2}$ respectively, and segments of outer cladding region may be identified as 4.1 and 4.2 having refractive index $n_{4.1}$ and $n_{4.2}$ respectively, or the relative refractive index $Del_{4.1}$, and $Del_{4.2}$ respectively and the thickness $X_{4.1}$ and $X_{4.2}$ respectively.

Figure 7:
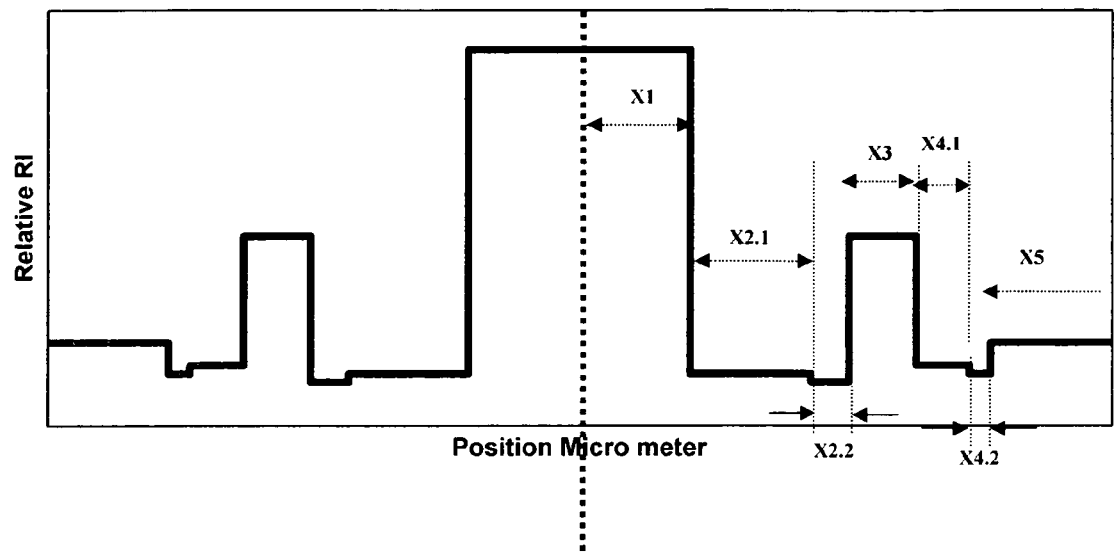
FIG. 7 shows refractive index profile of the optical fiber in accordance with third preferred embodiment of the present invention.

The fiber of third preferred embodiment of the present invention has refractive index profile along the radial axis of the fiber as shown in accompanying FIG. 7, wherein each of inner cladding and outer cladding region are divided into two segments and the outer cladding is depressed, which has been surprisingly observed to result in further reduction in bend induced loss and attenuation loss of the disclosed fiber.

In accordance with third preferred embodiment of the present invention, the relative refractive indices of various regions of the fiber measured by PK2600 refractive index profiler are selected within the range as specified in Table 3.1.

TABLE 3.1

| Relative refractive index | Symbol | Nominal | Min | Max |
|---|---|---|---|---|
| Centre Core | Del1 | 0.515372 | 0.481262 | 0.549446 |
| Inner clad (2.1) | Del2.1 | −0.03811 | −0.02425 | −0.05198 |
| Inner clad (2.2) | Del2.2 | −0.05371 | −0.03811 | −0.06932 |
| Ring core | Del3 | 0.172682 | 0.1589 | 0.186457 |
| Outer clad (4.1) | Del4.1 | −0.03464 | −0.02425 | −0.04504 |

TABLE 3.1-continued

| Relative refractive index | Symbol | Nominal | Min | Max |
|---|---|---|---|---|
| Outer clad (4.2) | Del4.2 | −0.05198 | −0.03811 | −0.06585 |
| Outer glass | Del5 | 0 | 0 | 0 |

In accordance with third preferred embodiment of the present invention, the thickness of the center core 1, inner cladding 2, ring core 3, outer clad 4, outer glass 5 identified as X1, X2, X3, X4 and X5 respectively of the fiber as illustrated in the accompanying FIG. 7 are selected within the range as defined in the Table 3.2.

TABLE 3.2

| Thickness | Symbol | Width Nominal | Min | Max | Unit |
|---|---|---|---|---|---|
| Centre Core | X1 | 2.625 | 2.00 | 3.25 | μm |
| Inner clad (2.1) | X2.1 | 4.050 | 3.30 | 4.80 | μm |
| Inner clad (2.2) | X2.2 | 0.750 | 0.00 | 1.50 | μm |
| Ring Core | X3 | 2.330 | 1.71 | 2.95 | μm |
| Outer clad (4.1) | X4.1 | 1.900 | 1.30 | 2.50 | μm |
| Outer clad (4.2) | X4.2 | 0.600 | 0.00 | 1.20 | μm |
| Outer glass | X5 | 51.995 | 48.65 | 54.54 | μm |

In accordance with fourth preferred embodiment of the present invention, the refractive indices of various regions of the presently disclosed dispersion optimized optical fiber for wideband transmission having presently disclosed configuration as illustrated in accompanying FIG. 4, that is comprising the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, are related in a manner that the centre core 1 has higher refractive index than that of the ring core 3, the ring core 3 has higher refractive index than that of the outer glass region 5, the outer cladding 4 has lower refractive index than that of the outer glass region 5, the inner cladding 2 has lower refractive index than that of the outer cladding region 4, that is the refractive index of various regions of the fiber is characterized by the equation 1a:—

$$n_1 > n_3 > n_5 > n_4 > n_2 \qquad \text{Eqn.(1a)}.$$

or by equation 1a1:—

$$Del_1 > Del_3 > Del_5 > Del_4 > Del_2 \qquad \text{Eqn.(1a1)}.$$

wherein each of the centre core, inner cladding and outer cladding region are divided into two segments wherein the segments of centre core region may be identified as 1.1 and 1.2 having refractive index $n_{1.1}$ and $n_{1.2}$ respectively, or the relative refractive index $Del_{1.1}$ and $Del_{1.2}$ respectively and the thickness $X_{1.1}$ and $X_{1.2}$ respectively, segments of inner cladding region may be identified as 2.1 and 2.2 having refractive index $n_{2.1}$ and $n_{2.2}$ respectively, or the relative refractive index $Del_{2.1}$ and $Del_{2.2}$ respectively and the thickness $X_{2.1}$ and $X_{2.2}$ respectively, and segments of outer cladding region may be identified as 4.1 and 4.2 having refractive index $n_{4.2}$ and $n_{4.2}$ respectively, or the relative refractive index $Del_{4.1}$ and $Del_{4.2}$ respectively and the thickness $X_{4.1}$ and $X_{4.2}$ respectively. The centre core region having two segments has been found to result in reduction in dopant concentration in the centre core region and that results in reduction in attenuation loss.

Figure 8:
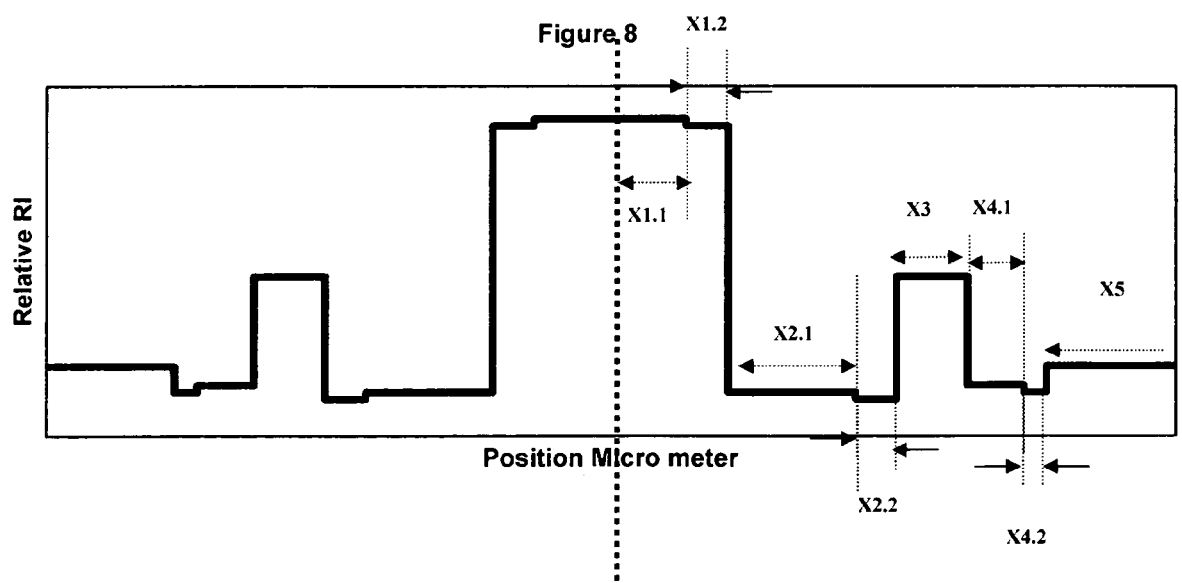
FIG. 8 shows refractive index profile of the optical fiber in accordance with fourth preferred embodiment of the present invention.

The fiber of fourth preferred embodiment of the present invention has refractive index profile along the radial axis of the fiber as illustrated in accompanying FIG. 8, wherein each of the centre core, inner cladding and outer cladding region are divided into two segments and the outer cladding is depressed, which has been surprisingly observed to result in further reduction in bend induced loss and attenuation loss of the disclosed fiber.

In accordance with fourth preferred embodiment of the present invention, the relative refractive indices of various regions of the fiber measured by PK 2600 refractive index profiler are selected within the range as specified in Table 4.1.

TABLE 4.1

| Relative refractive index | Symbol | Nominal | Min | Max |
|---|---|---|---|---|
| Centre Core (1.1) | Del1.1 | 0.515372 | 0.481262 | 0.549446 |
| Centre Core (2.1) | Del1.2 | 0.481262 | 0.447117 | 0.515372 |
| Inner clad (2.1) | Del2.1 | −0.03811 | −0.02425 | −0.05198 |
| Inner clad (2.2) | Del2.2 | −0.05371 | −0.03811 | −0.06932 |
| Ring core | Del3 | 0.172682 | 0.1589 | 0.186457 |
| Outer clad (4.1) | Del4.1 | −0.03464 | −0.02425 | −0.04504 |
| Outer clad (4.2) | Del4.2 | −0.05198 | −0.03811 | −0.06585 |
| Outer glass | Del5 | 0 | 0 | 0 |

In accordance with fourth preferred embodiment of the present invention, the thickness of the center core 1, inner cladding 2, ring core 3, outer clad 4, and outer glass 5 identified as X1, X2, X3, X4 and X5 respectively of the fiber as illustrated in the accompanying FIG. 8 are selected within the range as defined in the Table 4.2.

TABLE 4.2

| Thickness | Symbol | Width Nominal | Min | Max | Unit |
|---|---|---|---|---|---|
| Centre Core (1.1) | X1.1 | 2.625 | 2.00 | 3.25 | μm |
| Centre Core (1.2) | X1.2 | 0.625 | 0.00 | 1.25 | μm |
| Inner clad (2.1) | X2.1 | 4.050 | 3.30 | 4.80 | μm |
| Inner clad (2.2) | X2.2 | 0.750 | 0.00 | 1.50 | μm |
| Ring Core | X3 | 2.330 | 1.71 | 2.95 | μm |
| Outer clad (4.1) | X4.1 | 1.900 | 1.30 | 2.50 | μm |
| Outer clad (4.2) | X4.2 | 0.600 | 0.00 | 1.20 | μm |
| Outer glass | X5 | 51.995 | 48.65 | 54.54 | μm |

It may be noted that in accordance with present invention, the segments of various regions have different refractive index.

In accordance with fifth preferred embodiment of the present invention, the refractive indices of various regions of the presently disclosed dispersion optimized optical fiber for wideband transmission having presently disclosed configuration as illustrated in accompanying FIG. 4, that is comprising the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, are related in a manner that the centre core 1 has higher refractive index than that of the ring core 3, the ring core 3 has higher refractive index than that of the outer glass region 5, the outer cladding 4 has refractive index equal to that of the outer glass region 5, the inner cladding 2 has lower refractive index than that of the outer cladding region 4, that is the refractive index of various regions of the fiber is characterized by the equation 1a:—

$$n_1 > n_3 > n_5 = n_4 > n_2 \qquad \text{Eqn. (1b)}$$

or by equation 1b1.

$$Del_1 > Del_3 > Del_5 = Del_4 > Del_2 \qquad \text{Eqn. (1b1)}$$

Figure 9:
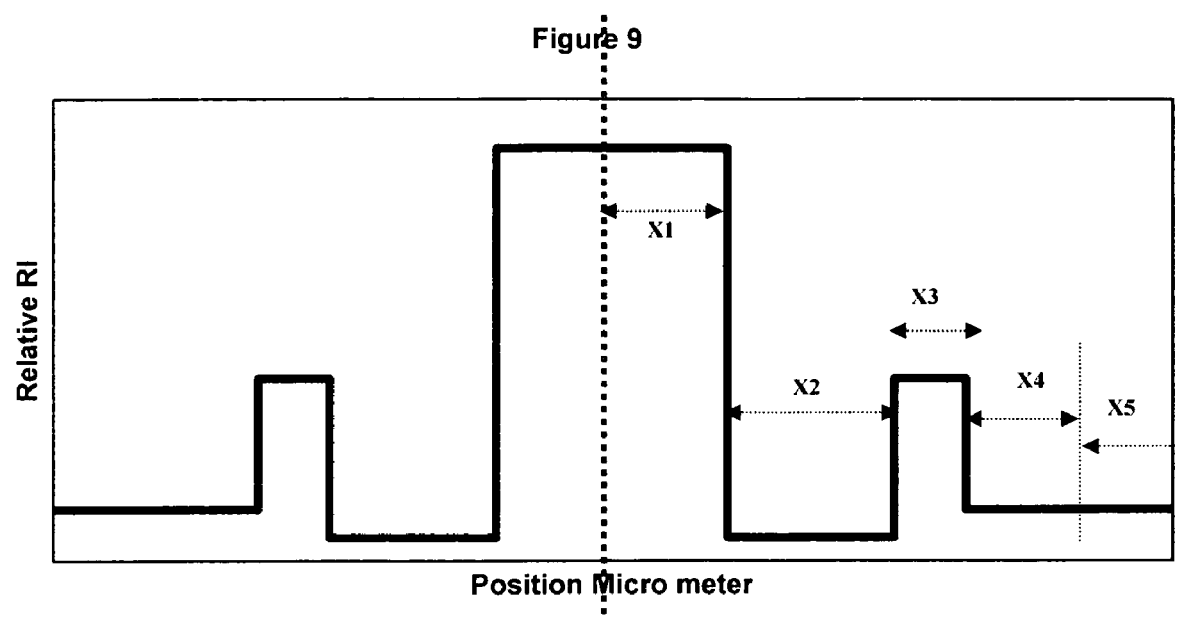
FIG. 9 shows refractive index profile of the optical fiber in accordance with fifth preferred embodiment of the present invention.

The fiber of fifth preferred embodiment of the present invention has refractive index profile along the radial axis of the fiber as illustrated in accompanying FIG. 9, wherein the refractive index of the outer cladding is equal to the refractive index of the outer glass region, which has been surprisingly observed to result in reduction in bend induced loss and attenuation loss of the disclosed fiber.

In accordance with fifth preferred embodiment of the present invention, the relative refractive indices of various regions of the fiber measured by PK 2600 refractive index profiler are selected within the range as specified in Table 5.1.

TABLE 5.1

| Relative refractive index | Symbol | Nominal | Min | Max |
|---|---|---|---|---|
| Centre Core | $Del_1$ | 0.515372 | 0.481262 | 0.549446 |
| Inner clad | $Del_2$ | −0.03811 | −0.02425 | −0.05198 |
| Ring core | $Del_3$ | 0.172682 | 0.1589 | 0.186457 |
| Outer clad | $Del_4$ | 0 | 0 | 0 |
| Outer glass | $Del_5$ | 0 | 0 | 0 |

In accordance with fifth preferred embodiment of the present invention, the thickness of the center core 1, inner cladding 2 ring core 3, outer clad 4 and outer glass 5 identified as X1, X2, X3, X4 and X5 respectively of the fiber as illustrated in the accompanying FIG. 9 are selected within the range as defined in the Table 5.2.

TABLE 5.2

| | | Width | | | |
|---|---|---|---|---|---|
| Thickness | Symbol | Nominal | Min | Max | Unit |
| Centre Core | X1 | 2.625 | 2.00 | 3.25 | μm |
| Inner clad | X2 | 4.050 | 3.30 | 4.80 | μm |
| Ring Core | X3 | 2.330 | 1.71 | 2.95 | μm |
| Outer clad | X4 | 1.900 | 1.30 | 2.50 | μm |
| Outer glass | X5 | 51.995 | 48.65 | 54.54 | μm |

In accordance with yet another embodiment of the present invention, the dispersion optimized optical fiber for wideband transmission comprises the centre core 1, the inner cladding 2, the ring core 3, the outer cladding 4 and the outer glass region 5, characterized in that the inner cladding 2 is provided onto the outer periphery of the centre core 1, the ring core 3 is provided onto the outer periphery of the inner cladding 2, the outer cladding 4 is provided onto the outer periphery of the ring core 3, and the outer glass region 5 surrounds the outer cladding 4, wherein the fiber comprises any one of the refractive index profile of above-defined embodiments referred as one embodiment, another embodiment, still another embodiment or yet another embodiment, and wherein the outer glass region of such fiber is provided with one or more overclad layers [not shown in figures] to achieve desired diameter of the outer glass region wherein the refractive index of the overclad layers is equal to that of refractive index of outer glass region. However, a care is taken that the overall configuration and the relationship of refractive index of each region of the fiber remains same. For example, in case of above-defined still another and yet another embodiments, the segments of centre core have higher refractive index than that of the segments of ring core, the segments of ring core have higher refractive index than that of the outer glass region, the segments of outer cladding have equal to or lower refractive index than that of the outer glass region, the segments of inner cladding have lower refractive index than that of the segments of outer cladding region meaning thereby the fiber is characterized by refractive index of each region being related by above defined equation 1a or equation 1b.

The dispersion optimized optical fiber of the present invention has been observed to have not only low dispersion, but also low dispersion slope, high effective area, reduced bending induced loss and low PMD meaning thereby has been observed to have all desired characteristic properties without sacrificing another desired characteristic property, and at the same time has non-zero dispersion not only at about 1550 nm, but also at about 1460 nm, meaning thereby having no non-linearity problem, and hence, has been found to be suitable for use not only for one channel of transmission, but also for more than one channel of transmissions.

Further, the dispersion optimized optical fiber of the present invention has also been found to be suitable for high speed wideband transmission in the wavelength region varying from about 1450 nm to about 1625 nm, that is including wavelength region not only from about 1530 nm to about 1565 nm (C-band region) and from about 1565 nm to about 1625 nm (L-band region), but also from about 1450 nm to about 1530 nm [S-band region].

Further, the dispersion optimized optical fiber of the present invention has also been found to be suitable for high-speed wideband transmission systems such as CWDM and DWDM not only for C-band region and L-band region, but also for S-band region.

The dispersion optimized optical fiber of the present invention has been found to have chromatic dispersion more than about 2.0 ps/nm.km, varying from about 5.5 to about 10.0 ps/nm.km and varying from about 7.5 to about 14 ps/nm.km over the operating wavelength varying from about 1460 to 1530 nm [S-band], varying from about 1530 to about 1565 nm (C-band) and varying from about 1565 to about 1625 nm (L-band) respectively, an effective area more than about 50 μm², preferably varying from about 50 μm² to about 65 μm² and maximum dispersion slope less than about 0.07 ps/nm².km over the said wavelength regions.

Further, the dispersion optimized optical fibers of the present invention having above described refractive index relationship as illustrated with the help of equation 1a [including equations 1a and 1a1] or 1b and as illustrated in the accompanying FIGS. 5, 6, 7, 8 and 9, and having configuration as illustrated with the help of accompanying FIG. 4 has been found to have characteristics—attenuation, PMD, MFD, cut off wavelength, core concentricity, cladding diameter, microbending, macrobending and proof test within the desired and permissible limits.

Further, the dispersion optimized optical fibers of the present invention having above described refractive index relationship as illustrated with the help of equation 1a [including equations 1a and 1a1] or 1b and as illustrated in the accompanying FIGS. 5, 6, 7, 8 and 9, and having configuration as illustrated with the help of accompanying FIG. 4 has been found to be not only easy to be achieved but also easy to be fabricated to produce a fiber having chromatic dispersion, effective area and dispersion slope characteristics in or closer to above described ranges or values over the operating wavelength region.

The dispersion optimized optical fiber of the present invention can be prepared by any method known in the at, for example can be prepared by Modified Chemical Vapor Deposition [MCVD], Outer Vapor deposition [OVD], Vapor Axial Deposition [VAD], Plasma Chemical Vapor Deposition [PCVD] processes, etc.

For example, the dispersion optimized optical fiber of the present invention can be prepared by MCVD process to have outer clad layers, ring core layers, inner clad layers and center core layers in the defined sequence inside the glass tube which is subjected to steps of dehydration, sintering and collapsing to form optical fiber preform, which is then subjected to step of draw to draw the dispersion optimized optical fiber of the present invention.

In accordance with one of the preferred embodiments of the present invention, the refractive index of the each region can be varied with the help of one or more dopants, for example with the help of germanium, phosphorous, fluorine etc.

Figure 10:
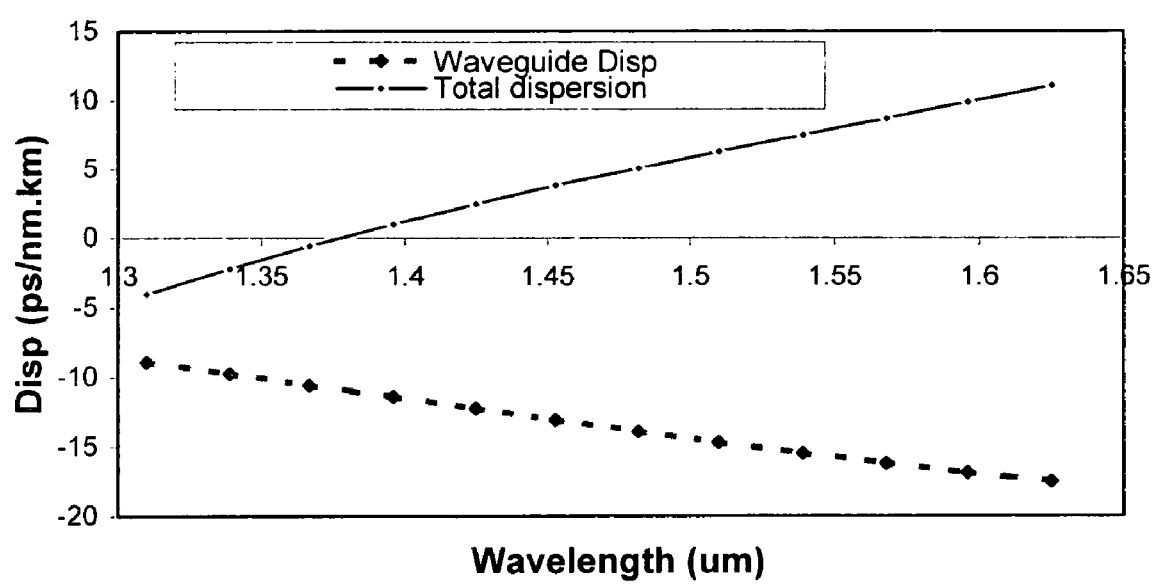
FIG. 10 shows the chromatic dispersion along with waveguide dispersion of the optical fiber shown in FIG. 4 in accordance with one of the preferred embodiments of the present invention.

The optical fiber produced in accordance with any one of the foregoing first, second, third and fourth embodiments has been found to have following characteristics:—
Attenuation at 1550 nm : $\leq$0.22 dB/Km
Dispersion Slope . . . : <0.05 ps/nm$^2$/km
MFD . . . :0.8-9.5 μm
Cut off wavelength : $\leq$1480 nm
Core concentricity : <0.6 μm
Cladding diameter :125±0.7 μm
Microbending : $\leq$0.05 dB/km at 1550 nm
Macrobending : $\leq$0.5 dB/km at 1550 nm
Proof test :about 100 kpsi
PMD : <0.2 ps/km$^{\wedge 0.5}$ The optical fiber produced in accordance with any one of the foregoing first, second, third and fourth embodiments has been found to show the chromatic dispersion which has been shown in accompanying FIG. 10 along with waveguide dispersion of the optical fiber shown in FIG. 4 in accordance with one of the preferred embodiments of the present invention.

The word "about" as used herein is intended to include the practical errors in achieving the respective value of any of the respective parameter.

It may be noted that various modifications of the present invention are possible without deviating from the intended scope of this invention which are also intended to be included within the scope of the present invention. Although specific terms are employed herein, they are used in a generic and descriptive sense only and not for purpose of limitation.

The invention claimed is:

1. A dispersion optimized optical fiber for wideband optical transmission comprising a centre core, a inner cladding, a ring core, a outer cladding and a outer glass region; characterized in that, relative refractive index of the centre core, the inner cladding, the ring core, the outer cladding and the outer glass region are constrained by the following equations:

$$0.4813 \leq Del_1 \leq 0.5495;$$

$$-0.0243 \geq Del_2 \geq -0.0520;$$

$$0.1590 \leq Del_3 \leq 0.1865;$$

$$-0.0243 \geq Del_4 \geq -0.0451; \text{ and}$$

$$Del_1 > Del_3 > Del_5 > Del_4 > Del_2;$$

wherein, the relative refractive index of the centre core, inner cladding, ring core, outer cladding and outer glass region is identified by symbols $Del_1$, $Del_2$, $Del_3$, $Del_4$, and $Del_5$ respectively.

2. The dispersion optimized optical fiber according to claim 1, wherein one or more regions of the fiber have more than one segments having different refractive index.

3. The dispersion optimized optical fiber according to claim 2, wherein the outer cladding region has an additional segment, the additional segment has a refractive index ranging from −0.0381 to −0.0659, and thickness ranging from 0.00 μm to 1.20 μm.

4. The dispersion optimized optical fiber according to claim 3, wherein the inner cladding region has an additional segment, the additional segment has a refractive index ranging from −0.0381 to −0.0693, and thickness ranging from 0.00 μm to 1.50 μm.

5. The dispersion optimized optical fiber according to claim 4, wherein the centre core region, has an additional segment, the additional segment has a refractive index ranging from 0.4471 to 0.5154, and thickness ranging from 0.00 μm to 1.25 μm.

6. The dispersion optimized optical fiber according to claim 1, wherein the fiber has chromatic dispersion more than about 2.0 ps/nm.km, varying from about 5.5 ps/nm.km to about 10.0 ps/nm.km and varying from about 7.5 ps/nm.km to about 14 ps/nm.km over the operating wavelength varying from about 1460 nm to 1530 nm (S-band), varying from about 1530 nm to about 1565 nm (C-band) and varying from about 1565 nm to about 1625 nm (L-band) respectively.

7. The dispersion optimized optical fiber according to claim 1, wherein the fiber has an effective area ranging from 50 μm$^2$ to 65 μm$^2$ at about 1550 nm.

8. The dispersion optimized optical fiber according to claim 1, wherein the fiber has maximum dispersion slope less than 0.07 ps/nm$^2$·km at 1550 nm.

9. The dispersion optimized optical fiber according to claim 1, wherein the fiber has following characteristics:
Attenuation at 1550 nm: $\leq$0.22 dB/Km;
Dispersion Slope: <0.07 ps/nm$^2$/km;
MFD:8 μm to 9.5 μm;
Cut off wavelength: $\leq$1480 nm;
Core concentricity: <0.6 μm;
Cladding diameter: 125 ±0.7 μm;
Microbending: $\leq$0.05 dB/km at 1550 nm;
Macrobending: $\leq$0.5 dB/km at 1550 nm;
Proof test: 100 kpsi; and
PMD: <0.2 ps/km $_{0.5}$.

10. The dispersion optimized optical fiber according to claim 1, wherein thickness ranges of the centre core, inner cladding, ring core, outer cladding and outer glass region are restricted by the following equations:

$$2.00 \,\mu \leq \text{center core} \leq 3.25 \,\mu m;$$

$$3.30 \,\mu m \leq \text{inner cladding} \leq 4.80 \,\mu m;$$

$$1.71 \,\mu m \leq \text{ring core} \leq 2.95 \,\mu m;$$

$$1.30 \,\mu m \leq \text{outer cladding} \leq 2.50 \,\mu m; \text{ and}$$

$$48.65 \,\mu m \leq \text{outer glass} \leq 54.54 \,\mu m.$$

11. A dispersion optimized optical fiber for wideband optical transmission comprising a centre core, a inner cladding, a ring core, a outer cladding and a outer glass region; characterized in that, relative refractive index of the centre core, the inner cladding, the ring core, the outer cladding and the outer glass region are constrained by the following equations:

$$0.4813 \leq Del_1 \leq 0.5495;$$

$$-0.0243 \geq Del_2 \geq -0.0520;$$

$0.1590 \leq Del_3 \leq 0.1865$;

$-0.0243 \geq Del_4 \geq -0.0451$; and $Del_1 > Del_3 > Del_5 > Del_4 > Del_2$;

wherein, the relative refractive index of the centre core, inner cladding, ring core, outer cladding and outer glass region is identified by symbols $Del_1$, $Del_2$, $Del_3$, $Del_4$, and $Del_5$ respectively, wherein thickness ranges of the centre core, inner cladding, ring core, outer cladding and outer glass region are restricted by the following equations:

$2.00 \mu m \leq$ center core $\leq 3.25 \mu m$;

$3.30 \mu m \leq$ inner cladding $\leq 4.80 \mu m$;

$1.71 \mu m \leq$ ring core $\leq 2.95 \mu m$;

$1.30 \mu m \leq$ outer cladding $\leq 2.50 \mu m$; and $48.65 \mu m \leq$ outer glass $\leq 54.54 \mu m$.

12. The dispersion optimized optical fiber according to claim 11, wherein one or more regions of the fiber have more than one segments.

13. The dispersion optimized optical fiber according to claim 12, wherein the outer cladding has an additional segment, the additional segment has a refractive index ranging from −0.0381 to −0.0659, and thickness ranging from 0.00 µm.

14. The dispersion optimized optical fiber according to claim 13, wherein the inner cladding has an additional segment, the additional segment has a refractive index ranging from −0.0381 to −0.0693, and thickness ranging from 0.00 µm to 1.50 µm.

15. The dispersion optimized optical fiber according to claim 14, wherein the center core has an additional segment, the additional segment has a refractive index ranging from 0.4471 to 0.5154, and thickness ranging from 0.00 µm to 1.25 µm.

16. The dispersion optimized optical fiber according to claim 11, wherein the fiber has chromatic dispersion more than 2.0ps/nm.km, varying from 5.5ps/nm.km to 10.0ps/nm.km and varying from 7.5to 14ps/nm.km over the operating wavelength varying from 1460to 1530nm (S-band), varying from 1530to 1565nm (C-band) and varying from 1565to 1625nm (L-band) respectively.

17. The dispersion optimized optical fiber according to claim 11, wherein the fiber has an effective area ranging from 50 µm$^2$ to 65 µm$^2$ at about 1550 nm.

18. The dispersion optimized optical fiber according to claim 11, wherein the fiber has maximum dispersion slope less than 0.07ps/nm$^2$·km at about 1550nm.

19. The dispersion optimized optical fiber according to claim 11, wherein the fiber has following characteristics:

Attenuation at 1550 nm: $\leq 0.22$ dB/Km;

Dispersion Slope: $< 0.07$ ps/nm$^2$/km;

MFD: 8.0 µm to 9.5 µm;

Cut off wavelength: $\leq 1480$nm;

Core concentricity: $< 0.6$ µm;

Cladding diameter: $125 \pm 0.7$ µm;

Microbending: $\leq 0.05$dB/km at 1550nm;

Macrobending: $\leq 0.5$dB/km at 1550nm;

Proof test: 100 kpsi; and

PMD: $< 0.2$ps/km$^{0.5}$.

20. A dispersion optimized optical fiber for wideband optical transmission comprising a centre core, a inner cladding, a ring core, a outer cladding and a outer glass region; characterized in that, relative refractive index of the centre core, the inner cladding, the ring core, the outer cladding and the outer glass region are constrained by the following equations:

$0.4813 \leq Del_1 \leq 0.5495$;

$-0.0243 \geq Del_2 \geq -0.0520$;

$0.1590 \leq Del_3 \leq 0.1865$;

$-0.0243 \geq Del_4 24 -0.045 1$; and $Del1 > Del3 > Del5 > Del4 > Del2$;

wherein, the relative refractive index of the centre core, inner cladding, ring core, outer cladding and outer glass region is identified by symbols Del1, Del2, Del3, Del4, and Del5 respectively, wherein thickness ranges of the centre core, inner cladding, ring core, outer cladding and outer glass region are restricted by the following equations:

$2.00 \mu m \leq$ center core $\leq 3.25 \mu m$;

$3.30 \mu m \leq$ inner cladding $\leq 4.80 \mu m$;

$1.71 \mu m \leq$ ring core $\leq 2.95 \mu m$;

$1.30 \mu m \leq$ outer cladding $\leq 2.50 \mu m$; and $48.65 \mu m \leq$ outer glass $\leq 54.54 \mu m$;

wherein, the fiber has an effective area ranging from 50 µm$^2$ to 65 µm$^2$ at about 1550 nm.

* * * * *